US008558924B2

(12) United States Patent
Kagei

(10) Patent No.: US 8,558,924 B2
(45) Date of Patent: Oct. 15, 2013

(54) CAMERA PLATFORM SYSTEM AND IMAGING SYSTEM

(75) Inventor: Kenji Kagei, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 194 days.

(21) Appl. No.: 13/094,412

(22) Filed: Apr. 26, 2011

(65) Prior Publication Data

US 2011/0267481 A1 Nov. 3, 2011

(30) Foreign Application Priority Data

Apr. 30, 2010 (JP) ................................. 2010-105133

(51) Int. Cl.
*H04N 5/262* (2006.01)
*H04N 7/18* (2006.01)
*G09G 5/00* (2006.01)

(52) U.S. Cl.
USPC ............................ 348/239; 345/632; 348/143

(58) Field of Classification Search
USPC .................... 348/143, 239; 345/632
See application file for complete search history.

(56) References Cited

U.S. PATENT DOCUMENTS

| | | | |
|---|---|---|---|
| 5,434,637 A * | 7/1995 | Ohta | ............................ 396/529 |
| 6,311,019 B1 | 10/2001 | Ide | |
| 2008/0165273 A1 | 7/2008 | Toguchi | |
| 2008/0211929 A1 * | 9/2008 | Uchihara | ................. 348/231.99 |
| 2010/0026821 A1 * | 2/2010 | Sato et al. | ................. 348/208.99 |
| 2010/0033567 A1 * | 2/2010 | Gupta et al. | ................... 348/143 |
| 2011/0115909 A1 * | 5/2011 | Sternberg et al. | ............. 348/143 |

FOREIGN PATENT DOCUMENTS

| | | |
|---|---|---|
| JP | 11-112856 A | 4/1999 |
| JP | 3478740 B2 | 12/2003 |

OTHER PUBLICATIONS

Extended European Search Report dated Jul. 29, 2011 for corresponding EP Patent Application No. 11164041.3.

* cited by examiner

*Primary Examiner* — Tuan Ho
*Assistant Examiner* — Shahbaz Nazrul
(74) *Attorney, Agent, or Firm* — Rossi, Kimms & McDowell LLP

(57) ABSTRACT

The camera platform system of the present invention operates at least one function selected from zoom/focus/tilt/pan/iris of a mounted camera or lens in response to an operation instruction output from an operation device. The camera platform system includes a drive control unit configured to convert an operation instruction output from the operation device into a drive control signal corresponding to any one motion of the zoom/focus/tilt/pan/iris; a motion prediction position calculation unit configured to calculate a motion prediction position of any one of the zoom/focus/tilt/pan/iris based on the drive control signal converted by the drive control unit; and a motion prediction position output unit configured to output the motion prediction position, which has been calculated by the motion prediction position calculation unit, as motion prediction position information.

8 Claims, 13 Drawing Sheets

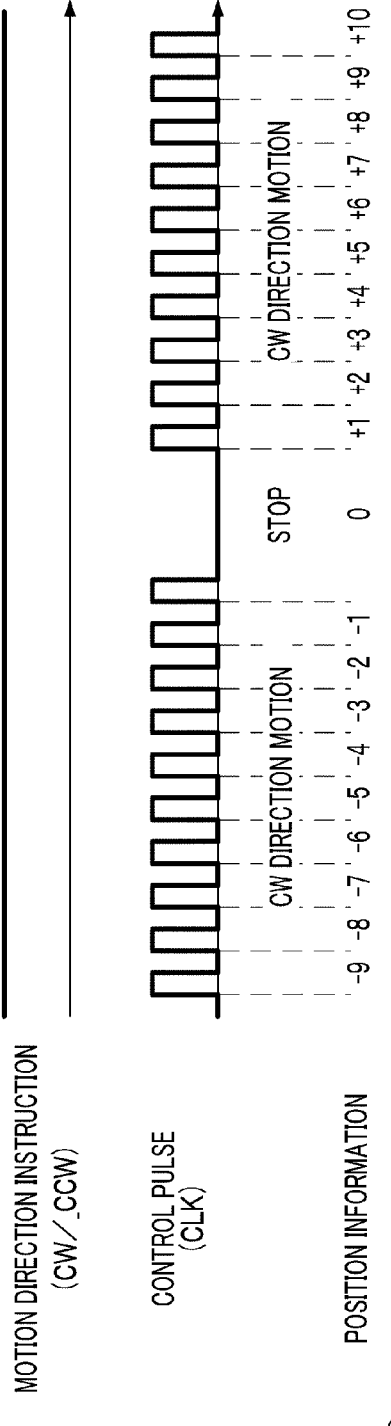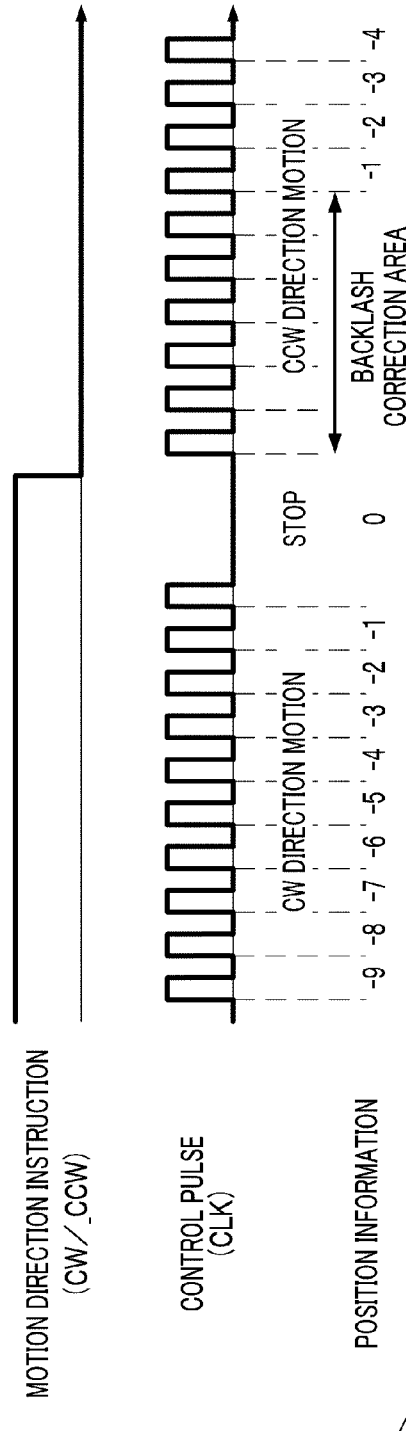
FIG. 4A
FIG. 4B

CAMERA PLATFORM SYSTEM AND IMAGING SYSTEM

BACKGROUND OF THE INVENTION

1. Field of the Invention

The present invention relates to an imaging system, and in particular, relates to a camera platform system that can remotely drive a zoom/focus/tilt/pan and the like.

2. Description of the Related Art

Conventionally, an imaging system (virtual studio system) for acquiring a composite image in which a photographed image is synthesized with a computer graphic (hereinafter referred to as "CG") image is well known. In the virtual studio system, a CG image, which is the background (or foreground) of a photographed image, needs to be changed in accordance with the motion of the photographed image. A camera serving as an imaging apparatus for obtaining a photographed image is mounted on a remote control camera platform that remotely controls panning for rotating the direction of the camera in the left and right direction, or tilting for rotating the direction of the camera in the up-and-down direction (pan/tilt), and zoom/focus of a lens. Furthermore, a camera platform system constituted by a camera, a lens, and a remote control camera platform together with an operation device for remotely controlling these components and an image synthesizing system for synthesizing a photographed image with a CG image form a virtual studio system. Separately from pan/tilt position information about the camera and zoom/focus position information about the lens, a photographed image captured by a camera is transmitted from the camera platform system to the image synthesizing system. The image synthesizing system generates a composite image in which a CG image (signal) is changed in accordance with the timing of the transmitted photographed image (signal), based on the photographed image (signal) transmitted from the camera platform system and information about the positions of the camera and the lens.

In this context, as a device for synchronizing the timing between a photographed image (signal) and a CG image (signal), Japanese Patent No. 3478740 discloses an imaging system that includes a lens device having a function of outputting position information using an encoder. Also, Japanese Patent Laid-Open No. 11-112856 discloses an image capturing apparatus that includes an operation unit provided with an operation device which shows the current position based on an instructed position signal by taking into account the delay factor of the drive units of the remote control camera platform.

However, in the imaging system employing an encoder, the encoder is disposed on the side of the lens device, a position detection mechanism such as an encoding counter or the like needs to be provided separately on the side of the image forming system, resulting in an increase in the size and the production cost of the apparatus. Also, when the imaging system is applied as a camera platform system, a lens to be mounted needs to have a position detection mechanism, and thus, the model of a lens that can be mounted in a remote control camera platform is limited.

On the other hand, in the apparatus that takes into account the delay factor of the drive units of the remote control camera platform, such an apparatus would be greatly affected by transmission delay when a long distance between the operation device and the remote control camera platform exists in the case of, for example, golf broadcast or when the apparatus is adopted into a system that is connected thereto via other equipment. In particular, in the case of establishing a connection using a public line where delay time is not constant, a change in delay time may greatly affect on the accuracy of a position signal. Furthermore, in a system in which a connection is established by switching an operation device and a plurality of remote control camera platforms such as in a sport (golf, baseball, etc.) broadcast or the like, the operation device needs to recognize information about the delay amount of all of the remote control camera platforms, resulting in a more complex configuration.

As described above, in an imaging system employing a conventional remote control camera platform, an expensive machine and a complex transmission path need to be constructed in order to synchronize a photographed image and a CG image, whereby the construction of an imaging system is necessitated depending on a desired utilization, resulting in a poor general applicability.

SUMMARY OF THE INVENTION

Accordingly, the present invention provides a remote control camera platform that has a simple structure without requiring a separate expensive position detection mechanism, is not readily affected by signal delay due to a transmission path between an operation device and the remote control camera platform, and is capable of outputting more accurate position information.

According to an aspect of the present invention, a camera platform system that operates at least one function selected from zoom/focus/tilt/pan/iris of a mounted camera or lens in response to an operation instruction output from an operation device is provided that includes a drive control unit configured to convert an operation instruction output from the operation device into a drive control signal corresponding to any one motion of the zoom/focus/tilt/pan/iris; a motion prediction position calculation unit configured to calculate a motion prediction position of any one of the zoom/focus/tilt/pan/iris based on the drive control signal converted by the drive control unit; and a motion prediction position output unit configured to output the motion prediction position, which has been calculated by the motion prediction position calculation unit, as motion prediction position information.

According to the present invention, a remote control camera platform that has a simple structure that does not require a separate expensive position detection mechanism, is not readily affected by signal delay due to a transmission path between an operation device and the remote control camera platform, and is capable of outputting more accurate position information may be provided.

Further features of the present invention will become apparent from the following description of exemplary embodiments with reference to the attached drawings.

BRIEF DESCRIPTION OF THE DRAWINGS

FIG. 4A is an explanatory diagram illustrating a method for updating position information performed by the imaging system of the present invention, and in particular illustrating a method for updating position information with respect to the control of a pan motor when the pan motor is operated in the same direction.

FIG. 4B is an explanatory diagram illustrating a method for updating position information performed by the imaging system of the present invention, and in particular illustrating a method for updating position information subjected to a backlash correction with respect to the control of a pan motor when the pan motor is operated in the reverse direction.

DESCRIPTION OF THE EMBODIMENTS

Hereinafter, preferred embodiments of the present invention will now be described with reference to the accompanying drawings.

(First Embodiment)

Figure 1:
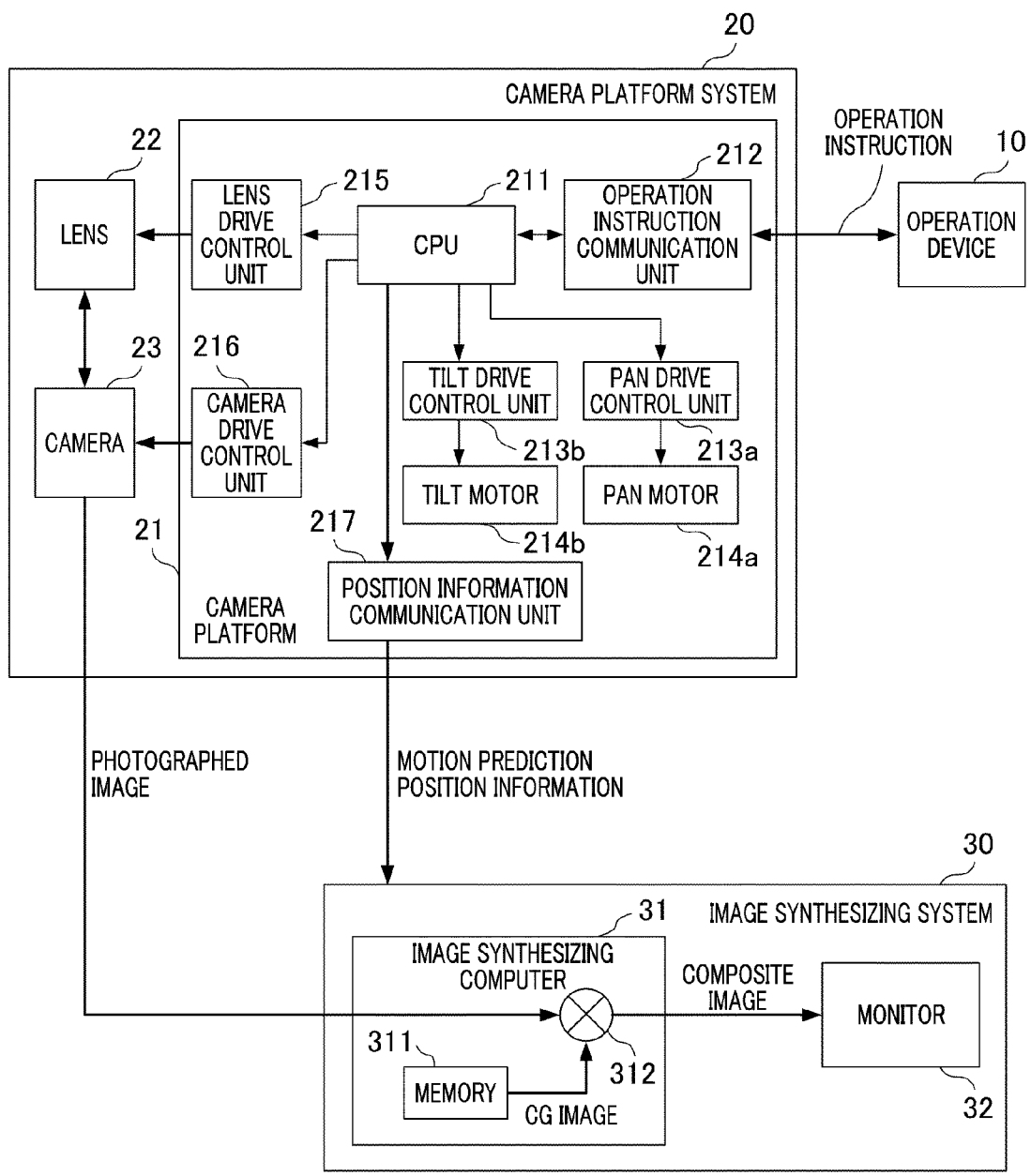
FIG. 1 is a block diagram illustrating the configuration of an imaging system according to a first embodiment of the present invention.

First, the configuration of an imaging system according to a first embodiment of the present invention will be described with reference to FIG. 1. FIG. 1 is a block diagram illustrating the configuration of an imaging system according to a first embodiment of the present invention. In FIG. 1, the imaging system of the present embodiment is constituted by an operation device 10, a camera platform system 20, and an image synthesizing system 30. An operator operates the operation device 10, and remotely operates the camera platform system 20 to thereby adjust zoom/focus/tilt/pan and various functions of a camera, whereby a desired image can be acquired. A photographed image acquired by the camera platform system 20 is synthesized with a CG image using the image synthesizing system 30.

The camera platform system 20 is constituted by a camera platform 21, a lens 22, and a camera 23. The camera platform 21 is constituted by a CPU 211, an operation instruction communication unit 212, a pan drive control unit 213a, a tilt drive control unit 213b, a pan motor 214a, a tilt motor 214b, a lens drive control unit 215, a camera drive control unit 216, and a position information communication unit 217. The CPU 211 receives an operation instruction given by the operation device 10 via the operation instruction communication unit 212. When the received operation instruction is a pan/tilt operation instruction, the operation instruction is converted into a drive control signal, and the drive control signal is output to the pan drive control unit 213a and the tilt drive control unit 213b to thereby operate the pan motor 214a and the tilt motor 214b. When the received operation instruction is a zoom/focus operation instruction, the operation instruction is converted into a drive control signal to thereby perform control of zoom/focus of the lens 22. When an operation instruction for the camera 23 is made, the operation instruction is converted into a drive control signal to thereby control the camera 23. Also, the CPU 211 outputs motion prediction position information regarding the motion prediction position, that is, the current position of a zoom/focus/tilt/pan/iris or the like (an object to be driven) to the position information communication unit 217 at a certain time interval. Hence, the CPU 211 functions as a motion prediction position calculation unit configured to convert the operation instruction output from the operation device 10 into a drive control signal corresponding to the operation of a zoom/focus/tilt/pan/iris and output the drive control signal to the drive control units 213a, 213b, 215, and 216. In addition, the CPU 211 functions as a motion prediction position output unit configured to output the motion prediction position of a zoom/focus/tilt/pan/iris based on the converted drive control signal. Furthermore, the position information communication unit 217 functions as a motion prediction position output unit configured to transmit the motion prediction position information to the image synthesizing system 30. Note that a program that controls the entire camera platform system 20 is stored in a storage unit (not shown) such as a hard disk or the like. The storage unit is also employed as a storage unit configured to store parameters for correcting a delay time from the conversion of the aforementioned drive control signal to the calculation of the motion prediction position. Furthermore, the storage unit is also employed as a storage unit configured to store parameters for correcting backlash (a time lag or a positional shift caused thereby) when a zoom/focus/tilt/pan is operated. While the CPU 211 calculates the motion prediction position (the integrated value of command values) as the current position at a certain time interval, the CPU 211 may also calculate the current and future motion prediction positions at a certain time interval when a position command (a command signal for specifying the target position) is made from the operation device 10.

The image synthesizing system 30 is constituted by an image synthesizing computer 31 and a monitor 32. A general purpose personal computer (PC) or the like is employed for the image synthesizing computer 31. Also, the image synthesizing computer 31 operates based on a program that is stored on a hard disk (not shown) or the like and carries out control relating to at least image synthesis in the imaging system of the present invention. A CG image, which has been generated by the image synthesizing computer 31 or other PC using an operation unit (not shown) such as a known keyboard/mouse, or the like is stored in a storage area 311 such as a hard disk, a memory, or the like. Furthermore, the CG image stored in the storage area 311 is output to a mixing circuit 312 by the operation instructions output from the operation device 10. Note that a program that controls the overall imaging system including the operation device 10 and the camera platform system 20 may be stored in the image synthesizing system 30.

Figure 2A:
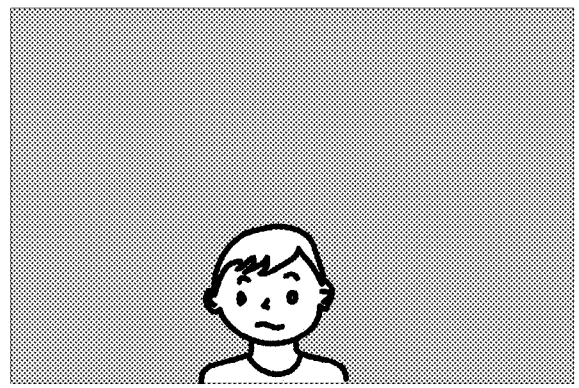
FIG. 2A is an explanatory diagram illustrating an example of an image, in particular, a photographed image obtained by the imaging system of the present invention.
Figure 2B:
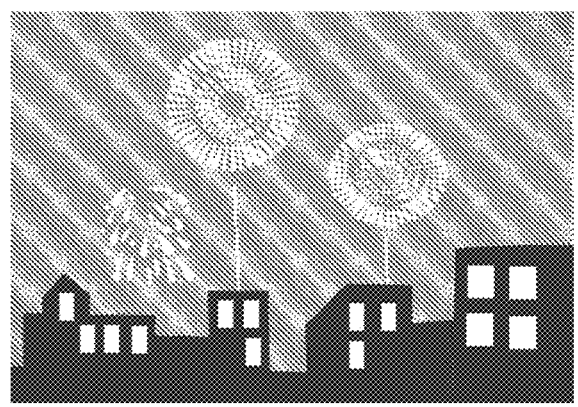
FIG. 2B is an explanatory diagram illustrating an example of an image, in particular, a CG image obtained by the imaging system of the present invention.
Figure 2C:
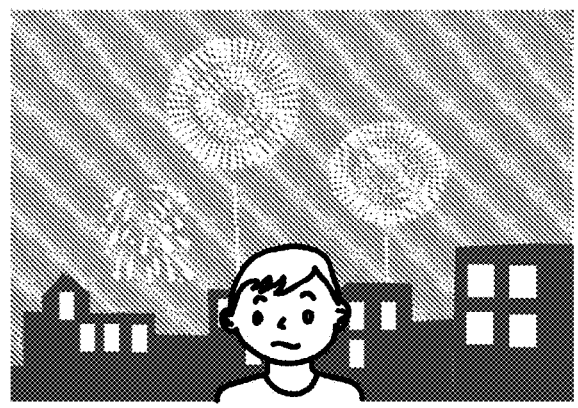
FIG. 2C is an explanatory diagram illustrating an example of an image, in particular, a composite image obtained by the imaging system of the present invention.

With this arrangement, the image synthesizing computer 31 generates a composite image by synthesizing a photographed image captured by the camera 23 with a CG image stored in a memory 311 using the mixing circuit 312 based on the position information received from the camera platform 21. For example, assume that the image synthesizing system 30 acquires an image shown in FIG. 2A from the camera 23. The image synthesizing computer 31 cuts out a required area as shown in FIG. 2B from the CG image stored in the storage area 311 based on the position information acquired from the camera platform system 20. Furthermore, processing for transmitting the background-color of the photographed image shown in FIG. 2A is carried out to thereby generate a composite image as shown in FIG. 2C. The generated composite image is displayed on the monitor 32, whereby an image such that as if an object in the photographed image is present in the CG image can be obtained.

Next, a pan motion prediction position information calculation method will now be described. A pan driving method is carried out by open loop control such that a stepping motor is used for the pan motor 214a, and the CPU 211 performs driver-control for the pan drive control unit 213a to thereby drive the pan motor 214a. When the pan motor 214a is driven, the CPU 211 provides a motion direction command which is adapted to the motion direction such as the CW direction or the CCW direction and generates a control pulse having a period corresponding to the drive speed to thereby control a pan motor driver, whereby the pan motor 214a is operated with arbitrary speed and direction. In the present embodiment, the CW direction means that between the motion directions (normal rotation and reverse rotation) of the pan motor 214a, the pan motor 214a drives in the same direction as the previous motion direction. Also, the CCW direction means that between the motion directions (normal rotation and reverse rotation) of the pan motor 214a, the pan motor 214a drives in the direction opposite to the previous motion direction. The CPU 211 manages the current pan position depending on the number of pulses which have been generated, and transmits a value (parameter), which has been subjected to a delay time correction and a backlash correction (to be described below) made for the current pan position, to the image synthesizing system 30 as motion prediction position information. Here, a backlash correction means the correction for the position error (positional shift) of an object to be driven under the influence of backlash.

Figure 3:
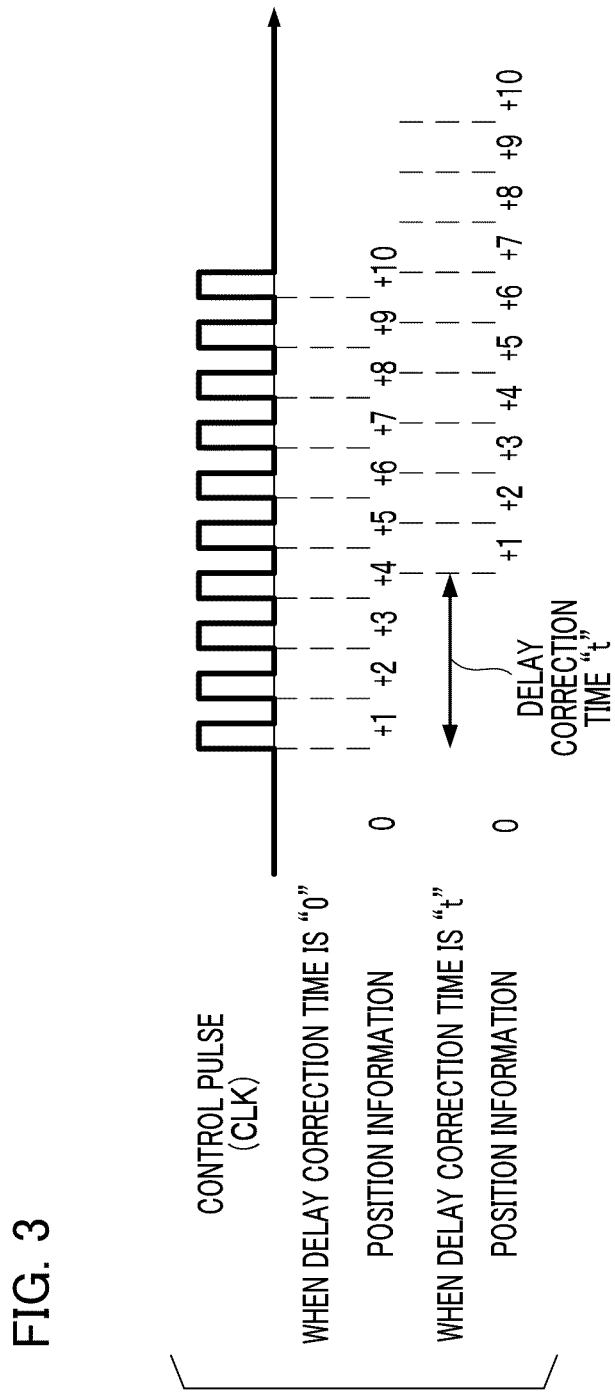
FIG. 3 is an explanatory diagram illustrating a method for updating position information performed by the imaging system of the present invention.

First, a delay time correction will now be described. As shown in FIG. 3, a delay time occurs as a time from the generation of a control pulse by the CPU 211 to the actual movement of the acquired image due to a signal delay from the CPU 211 to the pan motor 214a, mechanical bending of the respective drive systems, and the like. Thus, when position information is updated in the timing at which a pulse is generated from the CPU 211, that is, the timing at which a correction time "t" serving as a delay time correction value is "0", a delay composite image may be obtained such that an actual captured image moves with respect to the CG image in a delayed manner. Hence, for a correction time "t" serving as a delay time correction value, the CPU 211 adjusts the control position information prior to a certain predetermined time as motion prediction position information. In this way, position information less misaligned with the acquired image can be transmitted to the image synthesizing system 30.

Next, a backlash correction will be described. The respective drive systems have the backlash components of the mechanical elements due to the gear engagement. Hence, when a motor is driven in the same direction as the previous drive direction, no problem occurs. On the other hand, when a motor is driven in the direction opposite to the previous drive direction, an area may occur where an image to be actually acquired is not moving despite the fact that the control position of the CPU 211 has been updated. Thus, a composite image obtained when a reverse operation is carried out may become an image such that the portion of a photographed image is not moving despite the fact that a CG image is moving in a certain area. Therefore, when the operation of the motor is carried out in the same direction (from the CW direction to the CW direction) upon resumption of the operation of the motor after the motor has been stopped, position information is updated from the first pulse as shown in FIG. 4A. On the other hand, when the operation of the motor is carried out in the reverse direction (from the CW direction to the CCW direction) upon resumption of the operation of the motor after the motor has been stopped, a certain number of pulses are counted as a backlash correction area as shown in FIG. 4B, and then position information is updated. In this way, the position information with less misalignment from the acquired image can be transmitted to a virtual system.

While the aforementioned embodiment has been described for a delay time correction and a backlash correction for the pan, a zoom/focus/tilt can also be corrected using the same method. As a system derived from the present embodiment, the operation instruction communication unit 212, the pan drive control unit 213a, the tilt drive control unit 213b, the lens drive control unit 215, the camera drive control unit 216, and the position information communication unit 217 may be wholly or partially controlled by the CPU 211. Furthermore, while a description has been made of the example in which the lens 22 and the camera 23 are controlled by different systems, a camera model in which the camera 23 is integrated with the lens 22 may be mounted and both of them may be controlled by a camera/lens drive control unit in which the camera drive control unit 216 is integrated with the lens drive control unit 215. Also, a delay time correction value or a backlash correction value may be a value (parameter) set in advance, or may be externally changeable. Furthermore, while motion prediction position information is transmitted from the camera platform system 20 to the image synthesizing system 30 at a certain time interval, a position information request may be transmitted from the image synthesizing system 30 to the camera platform system 20 and then motion prediction position information may be transmitted back to the image synthesizing system 30 in response to the position information request.

(Second Embodiment)

Figure 5:
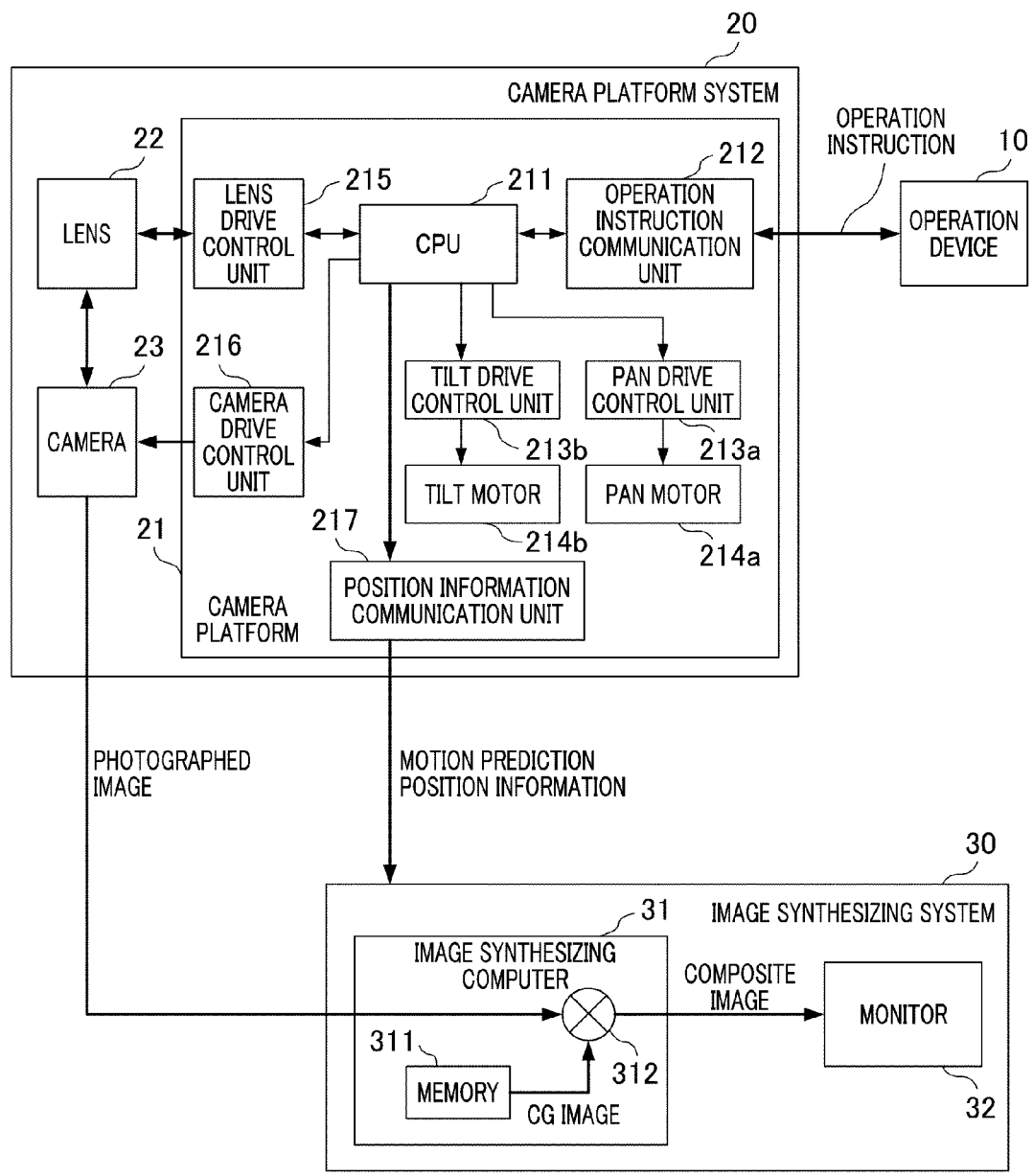
FIG. 5 is a block diagram illustrating the configuration of an imaging system according to a second embodiment.
Figure 6:
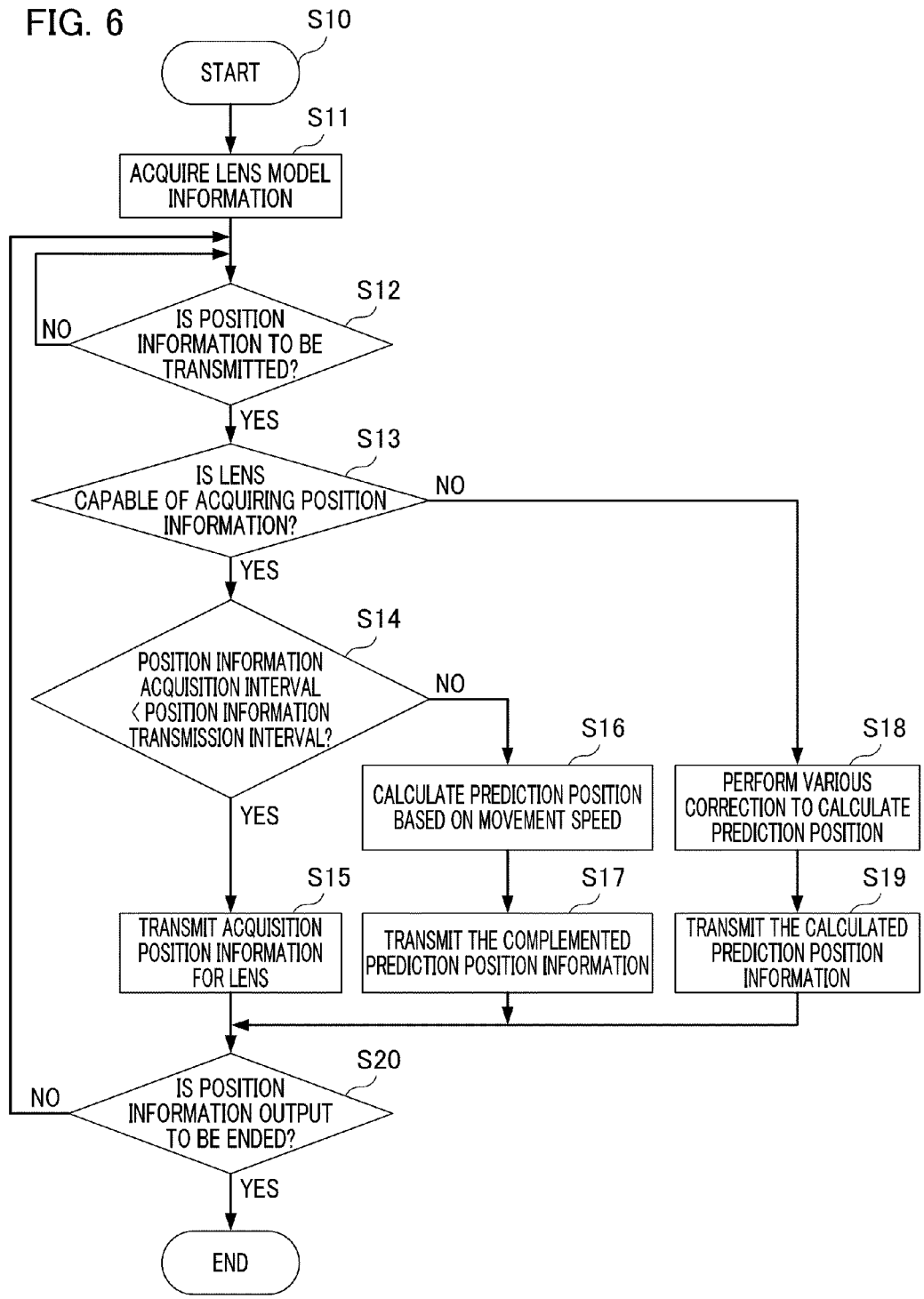
FIG. 6 is a flowchart illustrating the flow of processing executed by a CPU according to the second embodiment.

FIG. 5 is a block diagram illustrating the configuration of an imaging system according to a second embodiment of the present invention. The second embodiment (FIG. 5) differs from the first embodiment (FIG. 1) in that bi-directional communication can be established between the CPU 211 and the lens drive control unit 215 and between the lens drive control unit 215 and the lens 22. The same elements as those shown in the first embodiment are designated by the same reference numerals, and no further description will be given here. Hereinafter, the flow of processing performed by the CPU 211 up until position information about the lens 22 is transmitted to the image synthesizing system 30 will be described with reference to the flowchart shown in FIG. 6.

The CPU 211 performs lens model recognition processing for recognizing the model of the lens 22 in the lens drive control unit (lens model recognition unit) 215, and stores information regarding the model (step S11). Information regarding the model includes information regarding the accuracy of the lens and the presence/absence of a position detection mechanism. Next, in order to transmit position information to the image synthesizing system 30 at a certain time interval, the CPU 211 determines whether or not position information is in the timing for transmission (step S12). Here, when the CPU 211 determines that position information is not in the timing for transmission (N), the CPU 211 waits for the routine until a predetermined time has passed. When the CPU 211 determines that position information is in the timing for transmission (Y), the CPU 211 determines whether or not the lens 22 is a model with a position detection mechanism by which position information can be acquired (step S13). When the lens 22 is the model that is capable of acquiring position information (Y), the CPU 211 determines whether or not an interval within which actual position information can be acquired from the lens 22 is shorter than an interval within which position information is transmitted to the image synthesizing system 30 (step S14). Furthermore, when an interval within which actual position information can be acquired is shorter than the transmission interval (Y), the CPU 211 transmits position information to the image synthesizing system 30 while acquiring the position information from the lens 22 (step S15). With this arrangement, actual position information can be acquired with high accuracy.

When an interval within which actual position information can be acquired is longer than the transmission interval (N in step S14), the CPU 211 calculates the motion prediction position based on actual position information (step S16). At this time, when acquiring position information from the lens 22, the CPU 211 stores movement speed that is calculated from the difference between the acquired time when position information is acquired and the previously acquired position. Also, when the CPU 211 transmits motion prediction position information to the image synthesizing system 30, the CPU 211 complements motion prediction position information by adding a prediction movement distance, which is calculated from the elapsed time after the stored speed and the previous lens position information have been acquired, to the previous position information. Furthermore, the CPU 211 transmits the complemented motion prediction position information to the image synthesizing system 30 (step S17).

On the other hand, when the lens 22 is not the type that is incapable of acquiring position information (N in step S13), the CPU 211 calculates the motion prediction position in the same manner as the first embodiment (step S18). At this time, the magnitude of the backlash correction, the magnitude of the bending of the respective drive systems, and the like may differ depending on the model of the lens 22. Thus, the CPU 211 changes a backlash correction value described in the first embodiment in accordance with information regarding the model of the acquired lens 22, changes a motion prediction position calculation method, and transmits the calculated motion prediction position information to the image synthesizing system 30 (step S19).

Finally, when the CPU 211 has recognized that the image synthesizing system 30 is not in a connected state, the CPU 211 determines whether or not the output of position information is to be ended (step S20). When the output of position information continues, the process loops back to the position information transmission determination step in step S12.

As an imaging system derived from the second embodiment, a position information calculation method may be changed as in the case of the lens 22 such that information indicating whether or not the position information about a pan/tilt as well as the lens 22 is acquirable is acquired. Also, when the camera 23 has a function that corrects a captured image, which would affect a change in zoom/focus, the camera drive control unit (camera model recognition unit) 216 performs camera model recognition that recognizes the model of the camera 23. Then, a position information calculation method may be changed depending on the model of the recognized camera 23.

By employing the aforementioned method, the camera platform system 20 can transmit the position information, which has been calculated by a method suitable for the lens 22 and the camera 23, and the pan drive control unit 213*a* and the tilt drive control unit 213*b*, which are mounted thereon, to the image synthesizing system 30. With this arrangement, an even more accurate composite image can be obtained. Also, motion prediction position information can be calculated for the lens 22 and the camera 23 that are mounted on the camera platform system 20 regardless of the model of the lens 22 and the camera 23 provided with or without a position detection function, resulting in an increase in the general applicability of the camera platform system 20.

(Third Embodiment)

Figure 7:
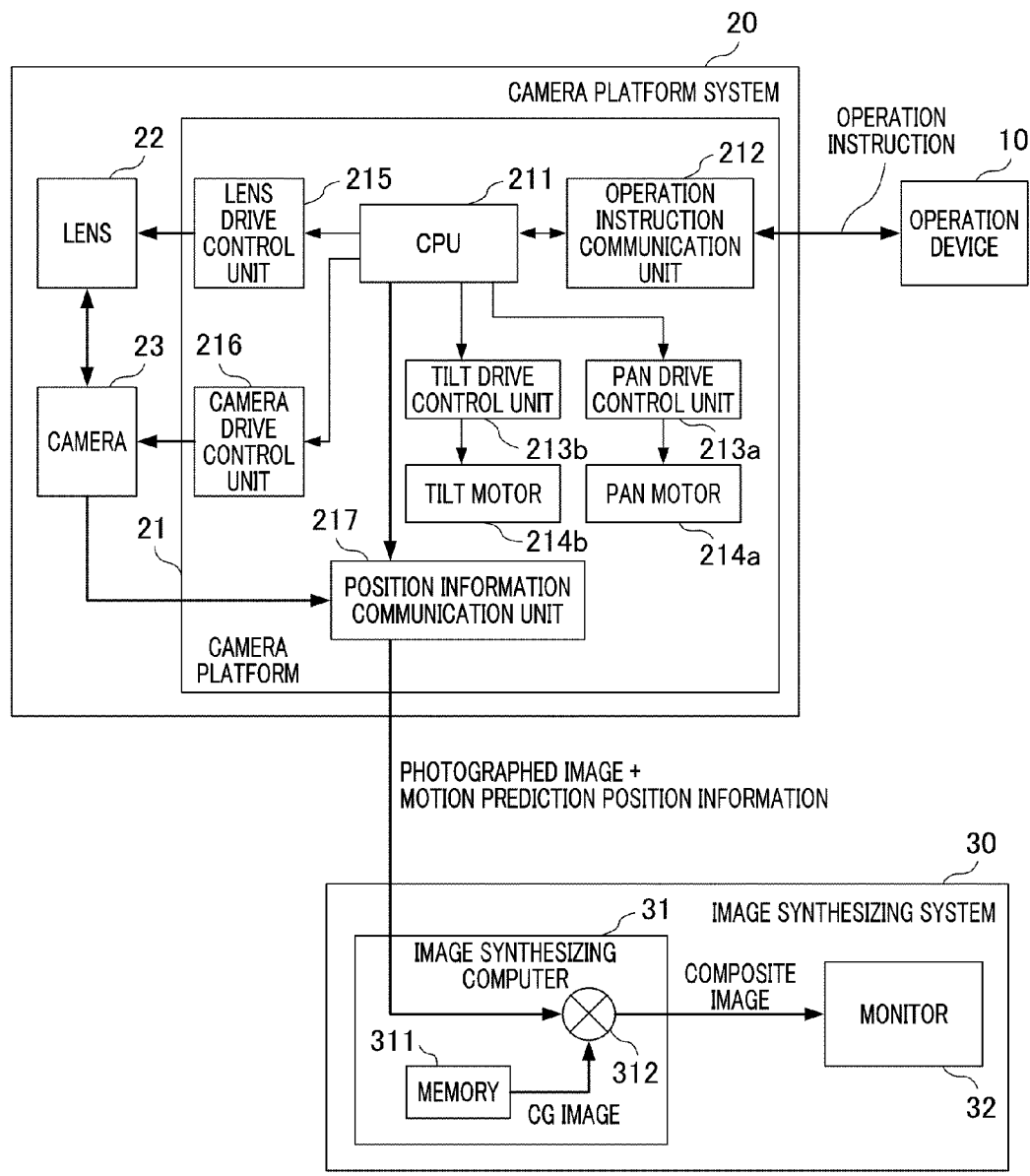
FIG. 7 is a block diagram illustrating the configuration of an imaging system according to a third embodiment of the present invention.

FIG. 7 is a block diagram illustrating the configuration of an imaging system according to a third embodiment of the present invention. The third embodiment (FIG. 7) differs from the first embodiment (FIG. 1) in that the position information communication unit 217 eliminated, and a position signal superimposition unit 218 is added. The same elements as those shown in the first embodiment are designated by the same reference numerals, and no further description will be given here.

The position signal superimposition unit 218 superimposes the motion prediction position information acquired as in the first embodiment on the image signal from the camera 23. For example, a blanking area of an HD-SDI (High Definition television-Serial Digital Interface) signal may be employed. More specifically, motion prediction position information is embedded in the blanking area of an HD-SDI signal, whereby the motion prediction position information on the photographed image acquired at a given time can be superimposed on an image signal for each frame. An image signal on which motion prediction position information is superimposed is transmitted to the image synthesizing computer 31, and an image synthesis computer 31 generates a composite image of a photographed image and a CG image based on the motion prediction position information embedded in an image signal.

In this manner, by superimposing motion prediction position information on a photographed image, a signal transmission line may be substantially simplified, whereby the general applicability may be improved, in particular when the signal transmission over long distance is required. As a system derived from the present embodiment, the function to superimpose a photographed image and motion prediction position information may not be provided within the camera platform system 20, but may be provided with a separate dedicated instrument. With this arrangement, centralized management may be readily performed when a plurality of camera platform systems 20 is employed.

By employing the aforementioned method, even when a control signal is delayed between the operation device 10 and the camera platform system 20, a composite image in which the movement of a photographed image and a CG image is not displaced relative to each other may be generated. Also, even when the difference in delay in motion prediction position information and an image signal between the camera platform system 20 and the image synthesizing system 30 is not constant, a composite image in which the movement of a photographed image and a CG image is not displaced relative to each other may be generated.

(Fourth Embodiment)

Figure 8:
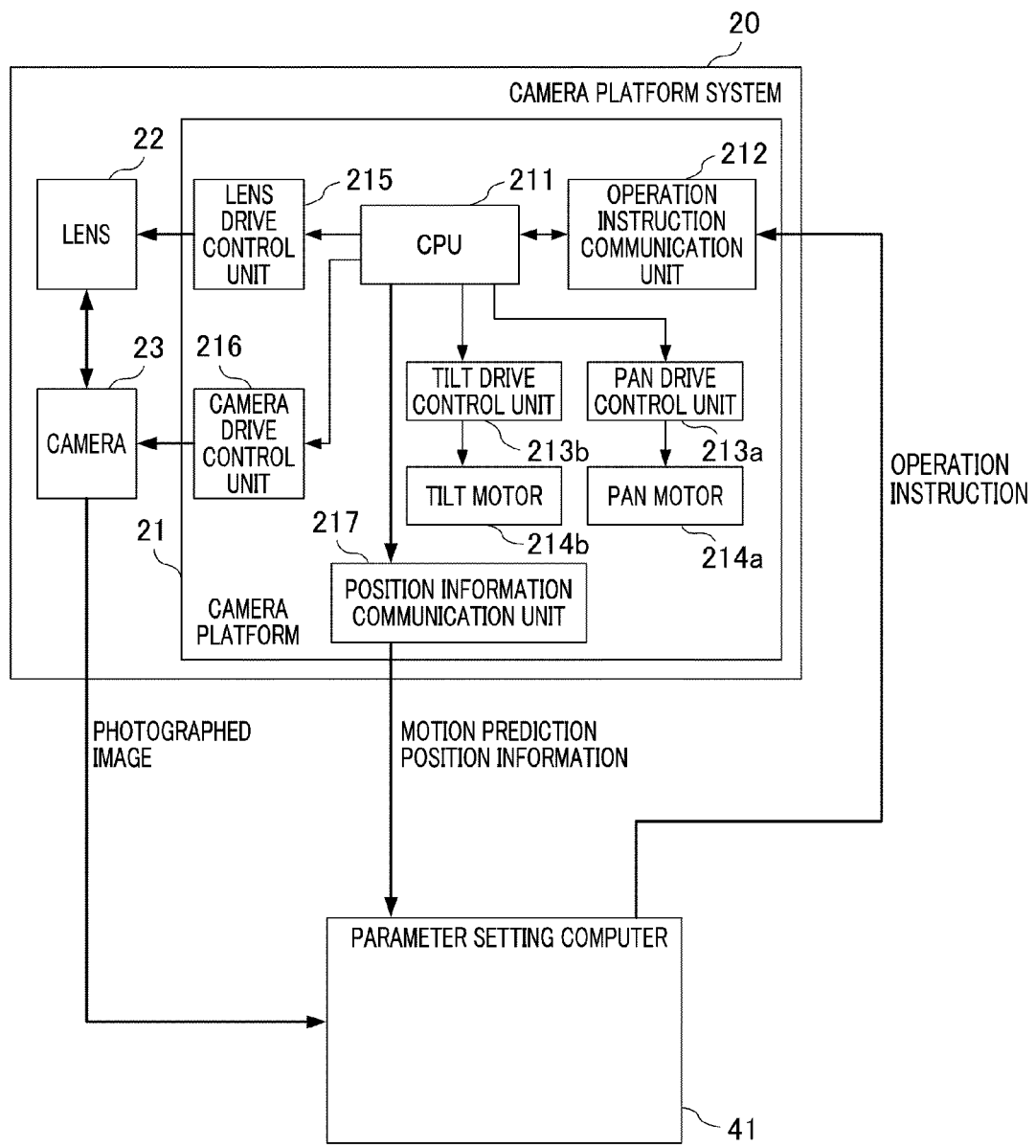
FIG. 8 is a block diagram illustrating the configuration of an imaging system according to a fourth embodiment of the present invention.

FIG. 8 is a block diagram illustrating the configuration of an imaging system according to a fourth embodiment of the present invention. The fourth embodiment (FIG. 8) differs from the first embodiment (FIG. 1) in that the operation device 10 and the image synthesizing system 30 eliminated, and a parameter setting computer 41, which automatically correct and set a delay time correction value and a backlash correction value described in the first embodiment, is added. The parameter setting computer 41 may transmit an operation instruction to the camera platform system 20, and operate a zoom/focus/tilt/pan. Furthermore, the parameter setting computer 41 acquires a photographed image and motion prediction position information from the camera platform system 20, and recognizes whether or not there has been a change in a photographed image and motion prediction position information.

Figure 9:
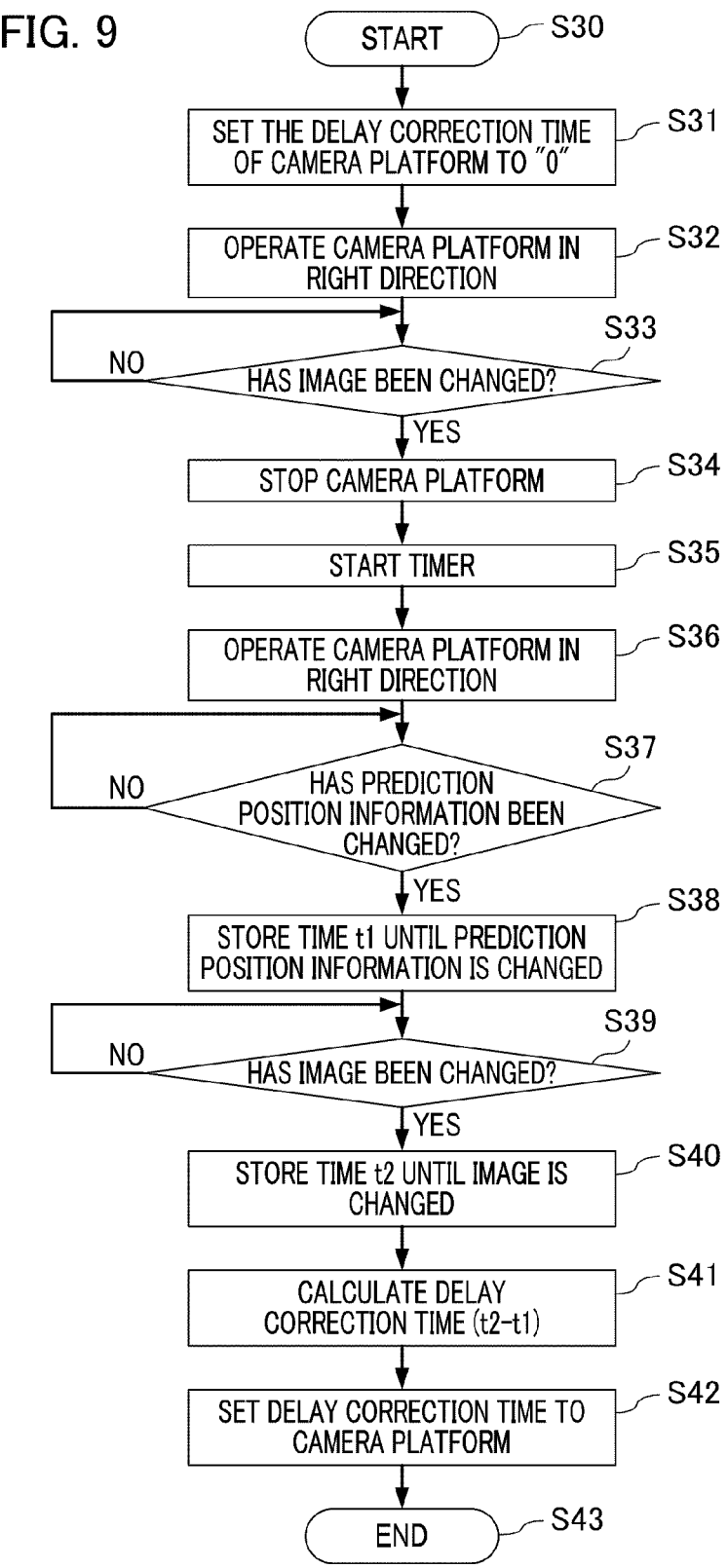
FIG. 9 is a flowchart illustrating the flow of processing executed by a parameter setting computer.

First, the flow of processing performed by the parameter setting computer 41 when the parameter setting computer 41 automatically sets a delay time correction value described in the first embodiment will be described with reference to the flowchart shown in FIG. 9. First, the parameter setting computer 41 sets the delay time correction value of the camera platform 21 to "0" so that the motion prediction position information acquired from the camera platform 21 is equal to the control position of the CPU 211 (step S31). Next, the parameter setting computer 41 transmits an operation instruction for operating the camera platform system 20 in the right direction in order to prevent the effect of pan backlash (step S32). Also, the parameter setting computer 41 compares the acquired photographed image for each frame, and thus confirms whether or not there has actually been a change in the image (step S33). When there has been a change in the image (Y), the parameter setting computer 41 pauses the camera platform system 20 (step S34). Furthermore, the parameter setting computer 41 causes a timer to start (step S35), and then again operates the camera platform system 20 in the right direction, that is, the same direction as the previous direction (step S36). At this time, the parameter setting computer 41 confirms whether or not motion prediction position information, that is, control position information of the CPU 211, changes (step S37). Then, when there has been a change in motion prediction position information (Y), the parameter setting computer 41 stores the time as the time t1 until there is a change in motion prediction position information (step S38). Furthermore, the parameter setting computer 41 confirms whether or not there has been a change in the actual image (step S39), and, when there has been a change in the image (Y), stores the time as the time t2 until the image changes (step S40), and calculate a time difference t2-t1 (step S41). The time difference represents a delay time from the start of control of the pan drive control unit 213a by the CPU 211 to the actual change of the photographed image. Thus, the parameter setting computer 41 sets the calculated time as the delay time correction value described in the first embodiment to the camera platform 21 (step S42).

Figure 10:
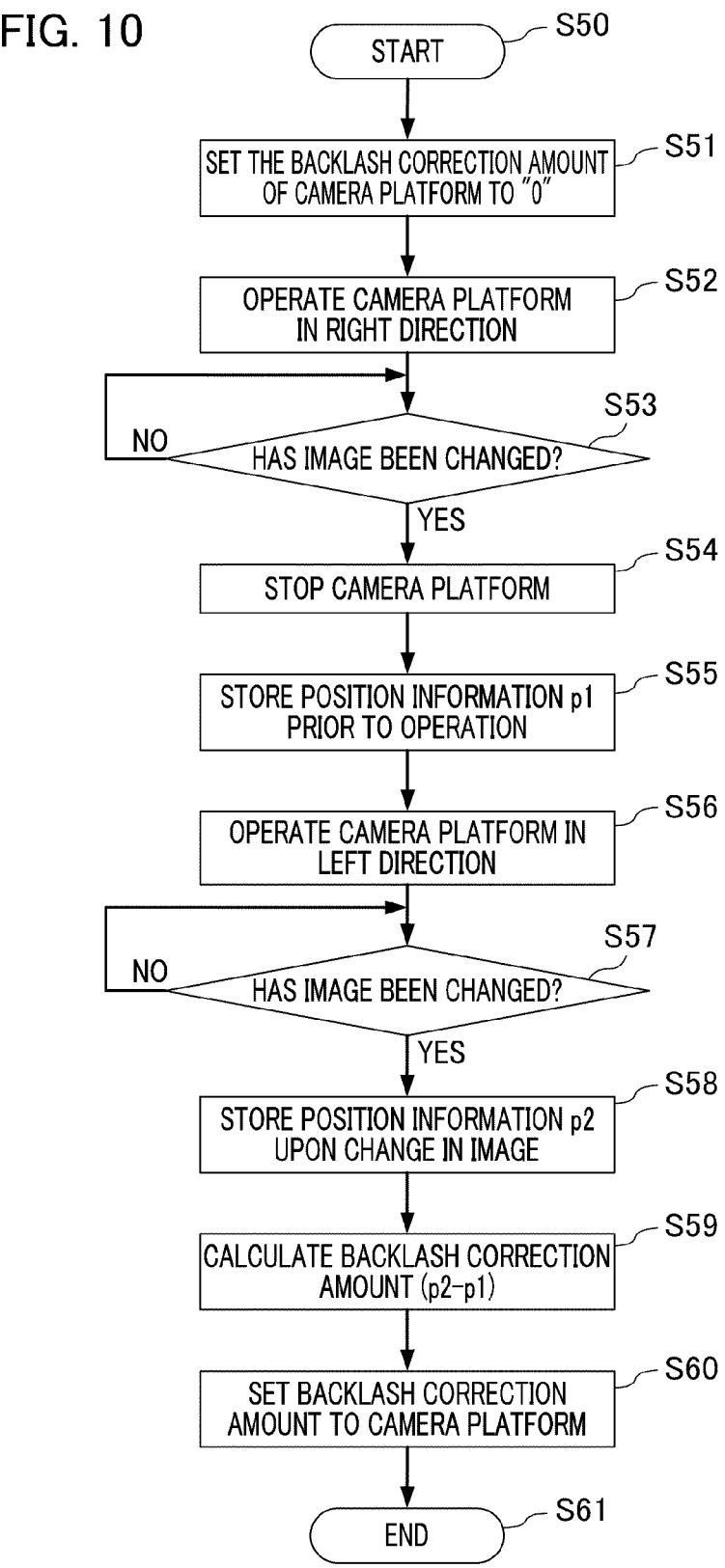
FIG. 10 is a flowchart illustrating the flow of processing executed by a parameter setting computer.

Next, the flow of the processing performed by the parameter setting computer 41 when the parameter setting computer 41 automatically sets a backlash correction value described in the first embodiment will be described with reference to the flowchart shown in FIG. 10. First, the parameter setting computer 41 sets the backlash correction value of the camera platform 21 to "0" (step S51). Next, the parameter setting computer 41 transmits an operation instruction for operating the camera platform 21 in the right direction (step S52). Also, the parameter setting computer 41 confirms that there has actually been a change in the image and then confirms whether or not the camera platform 21 has operated in the right direction (step S53). When there has been a change in the image (Y), the parameter setting computer 41 pauses the camera platform 21 (step S54), and stores the current motion prediction position information p1 (step S55). Then, the parameter setting computer 41 operates the camera platform 21 in the left direction, that is, the reverse direction (step S56), confirms a change in the image while acquiring motion prediction position information, and operates the camera platform 21 until the image changes (step S57). When there has been a change in the image (Y), the parameter setting computer 41 stores the motion prediction position information p2 for that time (step S58), and compares the motion prediction position information p2 with the motion prediction position information p1 prior to motion to thereby calculate the difference between the two pieces of information (step S59). The difference represents the amount of pan backlash, and thus the calculated difference value (parameter) is set as the backlash correction value described in the first embodiment to the camera platform 21 (step S60).

While the aforementioned embodiment has been described for the method for automatically setting a delay time correction value and a backlash correction value of the pan, a zoom/focus/tilt can also be automatically set using the same method. As a system derived from the present embodiment, the functions of the parameter setting computer 41 may be provided to the image synthesizing computer 31 used in the first to third embodiments, whereby the automatic settings may be performed regularly upon installation of the system, upon turning on the electric power, or the like. Also, the CPU 211 may perform processing performed by the parameter setting computer 41, whereby the functions of the parameter setting computer 41 may be provided within the camera platform system 20. By using the aforementioned method, a delay time correction value and a backlash correction value may be set automatically.

(Fifth Embodiment)

Figure 11:
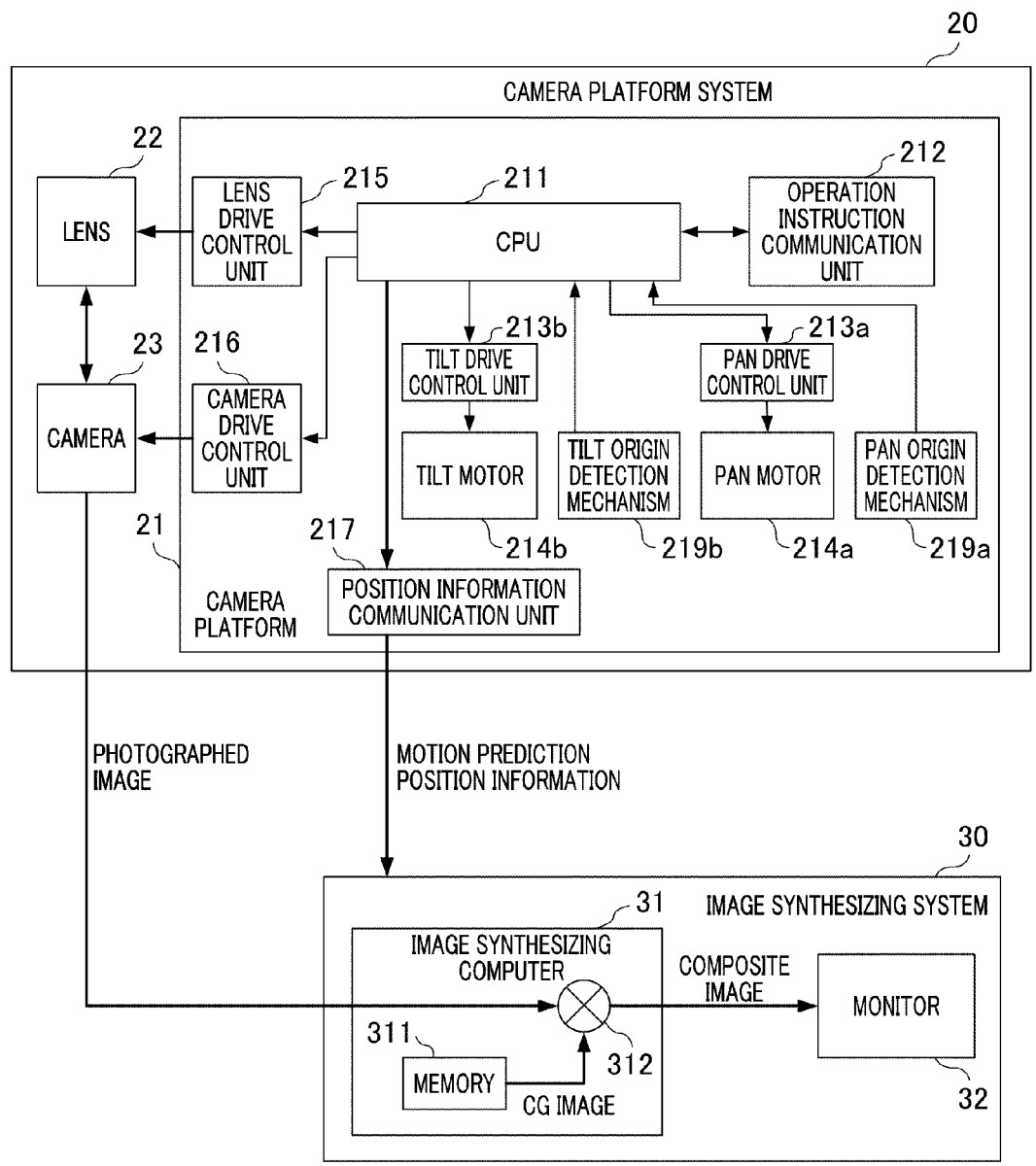
FIG. 11 is a block diagram illustrating the configuration of an imaging system according to a fifth embodiment.

FIG. 11 is a block diagram illustrating the configuration of an imaging system according to a fifth embodiment of the present invention. The fifth embodiment (FIG. 11) differs from the first embodiment (FIG. 1) in that a pan origin detection mechanism 219a and a tilt origin detection mechanism 219b are added as origin detection units.

Figure 12:
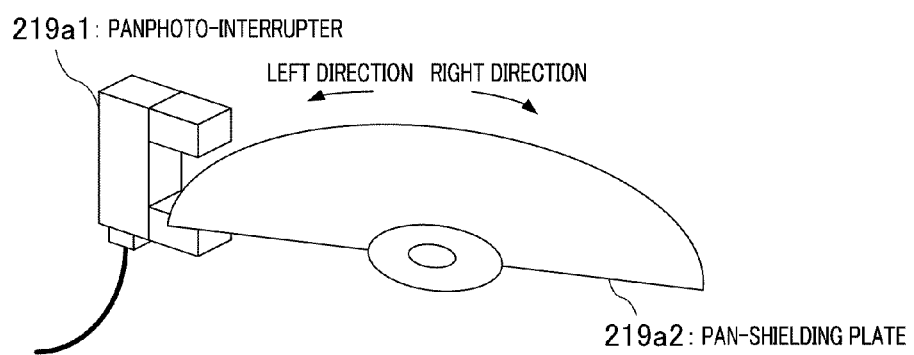
FIG. 12 is a schematic diagram illustrating the configuration of a pan origin detection mechanism according to the fifth embodiment.
Figure 13:
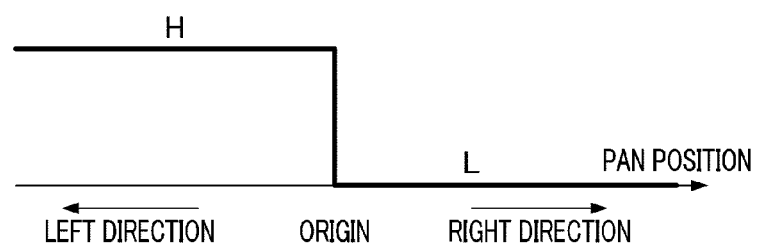
FIG. 13 is an explanatory diagram illustrating an output waveform of a photo-interrupter according to the fifth embodiment.

As shown in FIG. 12, the pan origin detection mechanism (origin detection unit) 219a is constituted by a panphoto-interrupter 219a1 and a semicircular pan-shielding plate 219a2. When the pan is rotated, the panphoto-interrupter 219a1 is mounted on a fixation shaft (not shown) so as not to be rotated, whereas the pan-shielding plate 219a2 is mounted on a rotation shaft so as to be rotated. In the fifth embodiment, the brake in the pan-shielding plate 219a2 is set as an origin, and the camera platform 21 is directed in the left direction of the origin when a photo-coupler (not shown) of the panphoto-interrupter 219a1 is obstructed, and in the right direction of the origin when a photo-coupler (not shown) of the panphoto-interrupter 219a1 is unobstructed. Thus, as shown in FIG. 13, the output of the panphoto-interrupter 219a1 outputs a High level (hereinafter referred to as "H-level") in the left direction and a Low level (hereinafter referred to as "L-level") in the right direction with reference to the origin. In this manner, by acquiring the output of the panphoto-interrupter 219a1, the CPU 211 may recognize that the camera platform 21 is directed in the left direction of the origin when the output is an H-level. Also, the CPU 211 may recognize that the camera platform 21 is directed in the right direction of the origin when the output is an L-level. When the CPU 211 detects the origin, the CPU 211 first detects the current direction of the camera platform 21 based on the output of the panphoto-interrupter 219a1, operates the camera platform 21 towards the origin direction, and recognizes the location at which the output of the panphoto-interrupter 219a1 has been switched as the origin.

Figure 14:
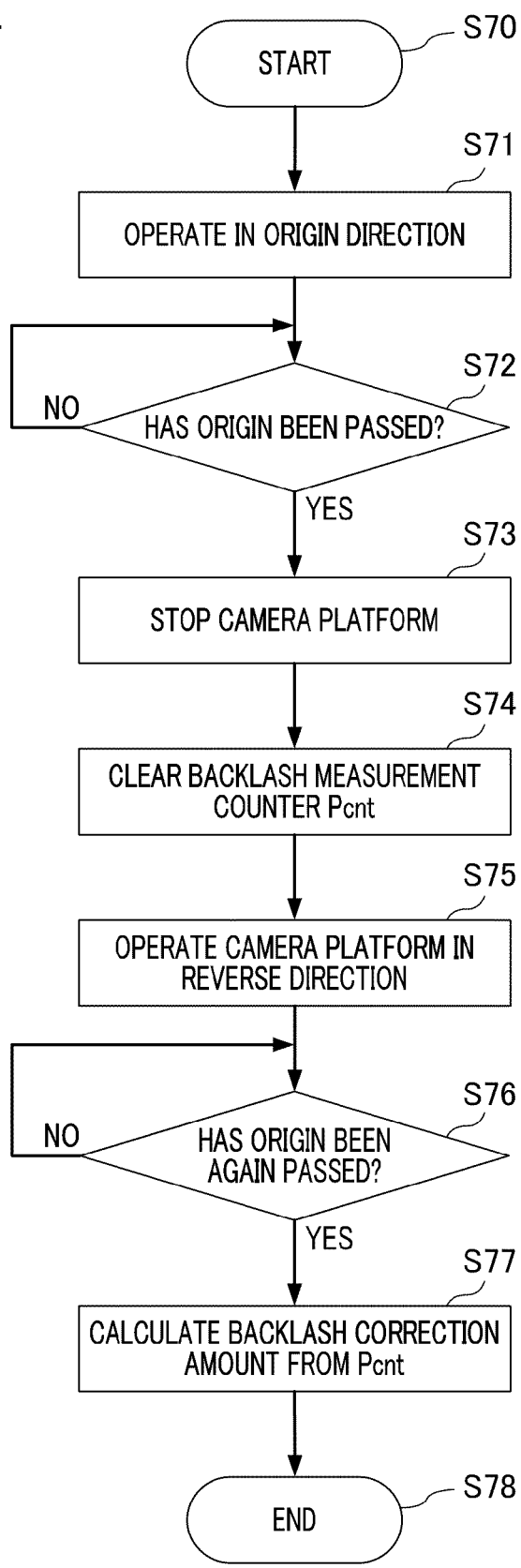
FIG. 14 is a flowchart illustrating the flow of processing executed by a CPU according to the fifth embodiment.

Hereinafter, the flow of processing performed by the CPU 211 when the camera platform system 20 alone sets a pan backlash correction value described in the first embodiment will be described with reference to the flowchart shown in FIG. 14. The CPU 211 operates the camera platform 21 towards the origin direction based on the output of the pan-photo-interrupter 219a1 of the pan origin detection mechanism (step S71). Also, when the output of the panphoto-interrupter 219a1 is switched between the H-level and the L-level, the CPU 211 determines that the camera platform 21 has passed the origin (Y in step S72), and stops the motion of the camera platform 21 (step S73). When the motion of the camera platform 21 is stopped, the CPU 211 clears a counter value Pcnt for backlash measurement (step S74). Next, the CPU 211 operates the camera platform 21 in the reverse direction (step S75). Furthermore, while incrementing a counter value Pcnt for backlash measurement by the number of pulses to be output, the CPU 211 operates the camera platform 21 until the H-level and the L-level are switched again, in other words, until the camera platform 21 passes through the origin again (step S76). Here, a counter value Pcnt for backlash measurement when the H-level and the L-level are switched again (Y in step S76) represents the amount of backlash. Thus, the CPU 211 calculates the counter value Pcnt or a value reflecting an error, which occurs when the counter value Pcnt or the level of the photo-interrupter 219a1 is switched between the H-level and the L-level, as a backlash correction value (step S77). Also, the calculated backlash correction value is stored as a backlash correction value described in the first embodiment, and is employed upon calculation of motion prediction position information.

While the aforementioned embodiment has been described for the method for automatically setting a backlash correction value of the pan, the tilt can also be set using the same method. When the same origin detection mechanism is provided, automatic settings can be made for zoom/focus. As a system derived from the present embodiment, an acceleration sensor may recognize whether or not the camera platform system 20 is actually operated instead of employing an origin detection mechanism. Also, when the lens 22 with a position detection mechanism described in the prior art is mounted, the position detection mechanism may be preferentially utilized, or the position detection mechanism may be invalidated. By using the method as described above, a backlash correction value may be automatically set using the camera platform system 20 alone without connecting it to other equipment.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-105133 filed Apr. 30, 2010 which is hereby incorporated by reference herein in its entirety.

What is claimed is:

1. A camera platform system that includes a camera that outputs a photographed image, a lens, and a camera platform that operates at least one function selected from zoom/focus/tilt/pan/iris of the camera or lens in response to an operation instruction output from an operation device, the camera platform system comprising:
    a drive control unit configured to convert the operation instruction output from the operation device into a drive control signal corresponding to any one of driven objects of the zoom/focus/tilt/pan/iris;
    a motion prediction position calculation unit configured to calculate a motion prediction position of any one of the driven objects of the zoom/focus/tilt/pan/iris based on the drive control signal converted by the drive control unit;
    a motion prediction position output unit configured to output the motion prediction position, which has been calculated by the motion prediction position calculation unit, as motion prediction position information; and
    a storage unit configured to store a delay time correction value for correcting a delay time from the conversion of the drive control signal to the calculation of the motion prediction position, and a backlash correction value for correcting backlash when any one of the driven objects is operated,
    wherein the motion prediction position calculating unit calculates a motion prediction position based on the drive control signal before a predetermined time as the delay time correction value and the drive control signal before driving for a predetermined drive amount as the backlash correction value.

2. The camera platform system according to claim 1, further comprising:
    a lens model recognition unit configured to recognize the model of the lens mounted to the camera,
    wherein the motion prediction position calculation unit changes a motion prediction position calculation method depending on the model of the lens.

3. The camera platform system according to claim 2, wherein the lens model recognition unit recognizes whether or not the lens is the model with a position detection mechanism, and when the lens model recognition unit determines that the model of the lens is the model with a position detection mechanism, the motion prediction position calculation unit applies the motion position information obtained from the position detection mechanism directly to the motion prediction position.

4. The camera platform system according to claim 2, wherein the lens model recognition unit recognizes whether or not the lens is the model with a position detection mechanism, and when the lens model recognition unit determines that the model of the lens is the model with a position detection mechanism and an acquisition interval of the motion position information obtained from the position detection mechanism is longer than a transmission interval during which the motion position information is transmitted, the motion prediction position calculation unit calculates a motion prediction position based on the motion prediction position information obtained from the position detection mechanism.

5. The camera platform system according to claim 1, further comprising:
    a camera model recognition unit configured to recognized the model of the camera,
    wherein the motion prediction position calculation unit changes a motion prediction position calculation method depending on the model of the camera.

6. The camera platform system according to claim 1, further comprising:
    an origin detection unit configured to detect an origin when any one of zoom/focus/tilt/pan is operated,
    wherein the motion prediction position calculation unit refers to a backlash correction value based on the output of the origin detection when the motion prediction position is calculated.

7. An imaging system comprising:

a camera platform system including a camera that outputs a photographed image, a lens, and a camera platform; and an image synthesizing system that acquires motion prediction position information and a photographed image from the camera platform system, and synthesizes the photographed image with a computer graphic image using the motion prediction position information, wherein the camera platform system operates at least one function selected from zoom/focus/tilt/pan/iris of the camera or lens in response to an operation instruction output from an operation device, wherein the camera platform system further comprises:

a drive control unit configured to convert an operation instruction output from the operation device into a drive control signal corresponding to any one of driven objects of the zoom/focus/tilt/pan/iris;

a motion prediction position calculation unit configured to calculate a motion prediction position of any one of the driven objects the zoom/focus/tilt/pan/iris based on the drive control signal converted by the drive control unit;

a motion prediction position output unit configured to output the motion prediction position, which has been calculated by the motion prediction position calculation unit, as motion prediction position information, wherein the image synthesizing system calculates a delay time correction value from a time difference between the time until the motion prediction position information changes and the time until the photographed image changes; and a storage unit configured to store a delay time correction value for correcting a delay time from the conversion of the drive control signal to the calculation of the motion prediction position, and a backlash correction value for correcting backlash when any one of the driven objects is operated, wherein the motion prediction position calculating unit calculates a motion prediction position based on the drive control signal before a predetermined time as the delay time correction value and the drive control signal before driving for a predetermined drive amount as the backlash correction value.

8. The imaging system according to claim 7, wherein the image synthesizing system automatically corrects the backlash correction value from the change amount of the motion prediction position information until the photographed image changes.

* * * * *